US011908607B2

(12) United States Patent
Hiraki et al.

(10) Patent No.: US 11,908,607 B2
(45) Date of Patent: Feb. 20, 2024

(54) MULTILAYER COIL COMPONENT

(71) Applicant: Murata Manufacturing Co., Ltd., Kyoto-fu (JP)

(72) Inventors: Makoto Hiraki, Nagaokakyo (JP); Ryohei Kawabata, Nagaokakyo (JP); Katsuhisa Imada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 560 days.

(21) Appl. No.: 17/196,924

(22) Filed: Mar. 9, 2021

(65) Prior Publication Data

US 2021/0287842 A1 Sep. 16, 2021

(30) Foreign Application Priority Data

Mar. 10, 2020 (JP) ................................ 2020-040860

(51) Int. Cl.
*H01F 27/28* (2006.01)
*H01F 41/04* (2006.01)
*H01F 27/29* (2006.01)

(52) U.S. Cl.
CPC ......... *H01F 27/2804* (2013.01); *H01F 27/29* (2013.01); *H01F 41/043* (2013.01); *H01F 2027/2809* (2013.01)

(58) Field of Classification Search
CPC .... H01F 27/2804; H01F 27/29; H01F 41/043; H01F 2027/2809; H01F 17/0013; H01F 17/04; H01F 27/292; H01F 27/28; H01F 27/32
See application file for complete search history.

(56) References Cited

U.S. PATENT DOCUMENTS

| | | | |
|---|---|---|---|
| 5,251,108 A * | 10/1993 | Doshita | H05K 1/116 361/728 |
| 2010/0127812 A1* | 5/2010 | Maeda | H01F 3/08 336/200 |
| 2013/0200980 A1* | 8/2013 | Yokoyama | H01F 27/292 336/200 |
| 2014/0253277 A1* | 9/2014 | Takezawa | H01F 17/0013 336/200 |

FOREIGN PATENT DOCUMENTS

JP 2015-018852 A 1/2015

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

A multilayer coil component includes a multilayer body that includes insulating layers that are stacked; a coil disposed in the multilayer body; and outer electrodes disposed on surfaces of the multilayer body and electrically connected to the coil. The coil includes at least two coil conductor groups that each include at least two coil conductors connected to each other in parallel through two coupling conductors. The at least two coil conductor groups are connected to each other in series through a connecting conductor. The connecting conductor connects the coil conductor between the two coupling conductors in one of the at least two coil conductor groups to the coil conductor between the two coupling conductors in another one of the at least two coil conductor groups.

4 Claims, 7 Drawing Sheets

--Prior Art--

MULTILAYER COIL COMPONENT

CROSS-REFERENCE TO RELATED APPLICATION

This application claims benefit of priority to Japanese Patent Application No. 2020-040860, filed Mar. 10, 2020, the entire content of which is incorporated herein by reference.

BACKGROUND

Technical Field

The present disclosure relates to a multilayer coil component.

Background Art

Under recent trends toward higher current, coil components have been increasingly required to achieve a lower DC resistance. Increasing the cross-sectional area of a conductor constituting a coil is a typical approach for decreasing the DC resistance. However, in multilayer coil components, increasing the thickness of the coil conductor can lead to structural defects such as cracks.

To address this issue, Japanese Unexamined Patent Application Publication No. 2015-18852 discloses a multilayer electronic component that includes insulator layers and conductive patterns stacked on top of each other, in which a coil is formed in a multilayer body by connecting conductor patterns through an insulator layer. In this multilayer electronic component, the coil includes conductor pattern pairs each constituted by two conductor patterns disposed on top of each other with an insulator layer therebetween. Two end portions of these two conductor patterns are connected to each other through a first connecting portion that establishes a parallel connection between these two conductor patterns, and the conductor pattern pairs are connected to one another in series through second connecting portions. The positions of the first connecting portions are shifted from the positions of the second connecting portions in a line length direction of the coil patterns (refer to Claim 1 of Japanese Unexamined Patent Application Publication No. 2015-18852).

As illustrated in FIG. 8, in the multilayer electronic component disclosed in this Patent Document, concentration of electric current occurs in regions (regions marked by broken lines in the drawing) in conductor patterns 103 near a first connecting portion 101 and near a second connecting portion 102, possibly resulting in temperature elevation and defects.

SUMMARY

Accordingly, the present disclosure provides a highly reliable multilayer coil component in which the concentration of electric current in the conductor patterns near the connecting portions is reduced.

The present disclosure includes the following embodiment.

[1] A multilayer coil component including: a multilayer body that includes insulating layers that are stacked; a coil disposed in the multilayer body; and outer electrodes disposed on surfaces of the multilayer body and electrically connected to the coil, in which the coil includes at least two coil conductor groups that each include at least two coil conductors connected to each other in parallel through two coupling conductors. The at least two coil conductor groups are connected to each other in series through a connecting conductor, and the connecting conductor connects part of the coil conductor between the two coupling conductors in one of the at least two coil conductor groups to part of the coil conductor between the two coupling conductors in another one of the at least two coil conductor groups.

[2] The multilayer coil component described in [1] above, in which the connecting conductor has a cross-sectional area at least twice as large as a cross-sectional area of the one coil conductor to which this connecting conductor connects.

[3] The multilayer coil component described in [1] or [2] above, in which a void portion is formed between the coil conductor and the insulating layer.

Other features, elements, characteristics and advantages of the present disclosure will become more apparent from the following detailed description of preferred embodiments of the present disclosure with reference to the attached drawings.

DETAILED DESCRIPTION

Figure 1:
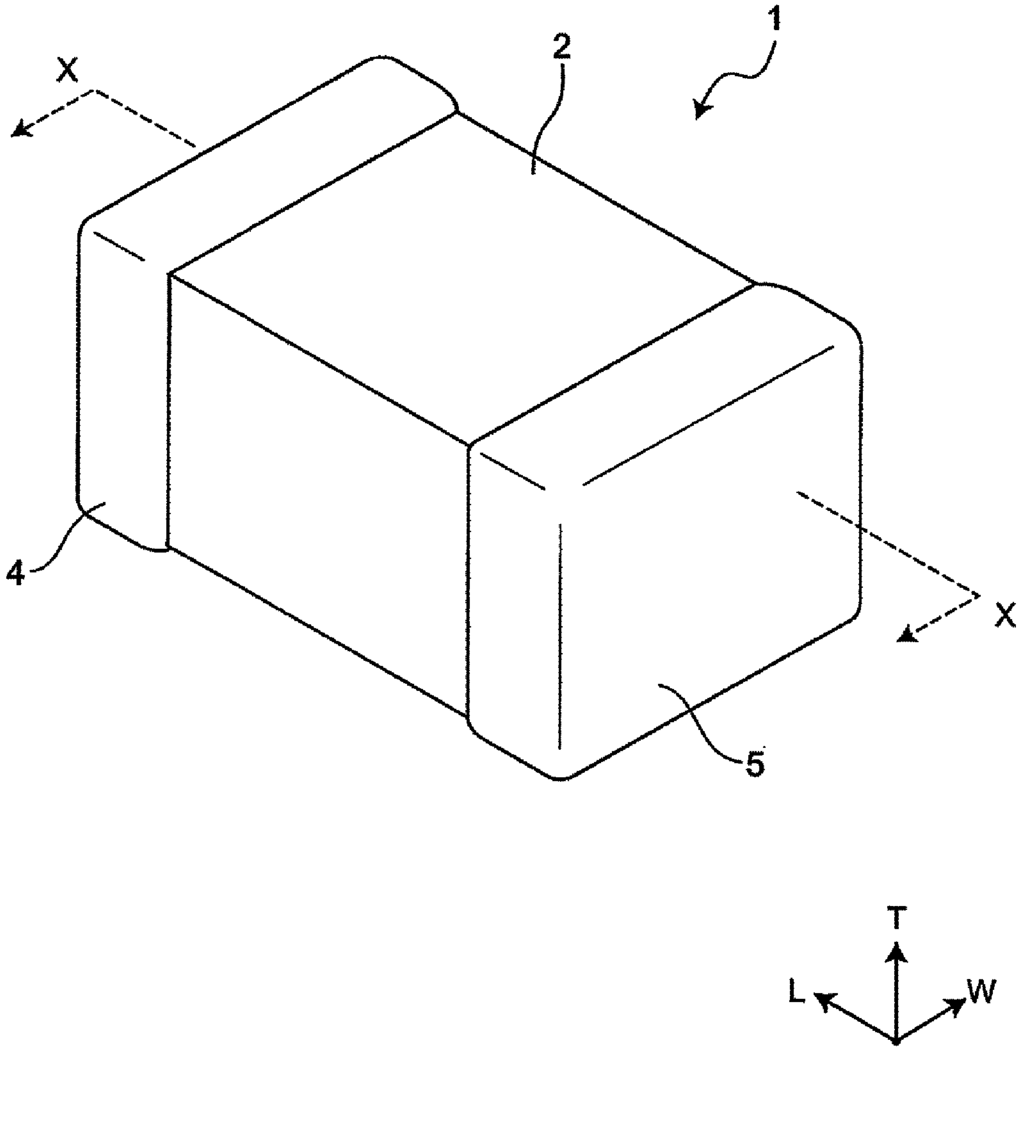
FIG. 1 is a schematic perspective view of a multilayer coil component of the present disclosure.

A multilayer coil component 1 according to one embodiment of the present disclosure will now be described in detail by referring to the drawings. The shape, arrangement, and other features of the multilayer coil component of this embodiment and respective constituent elements thereof are not limited by the examples illustrated in the drawings.

Figure 2:
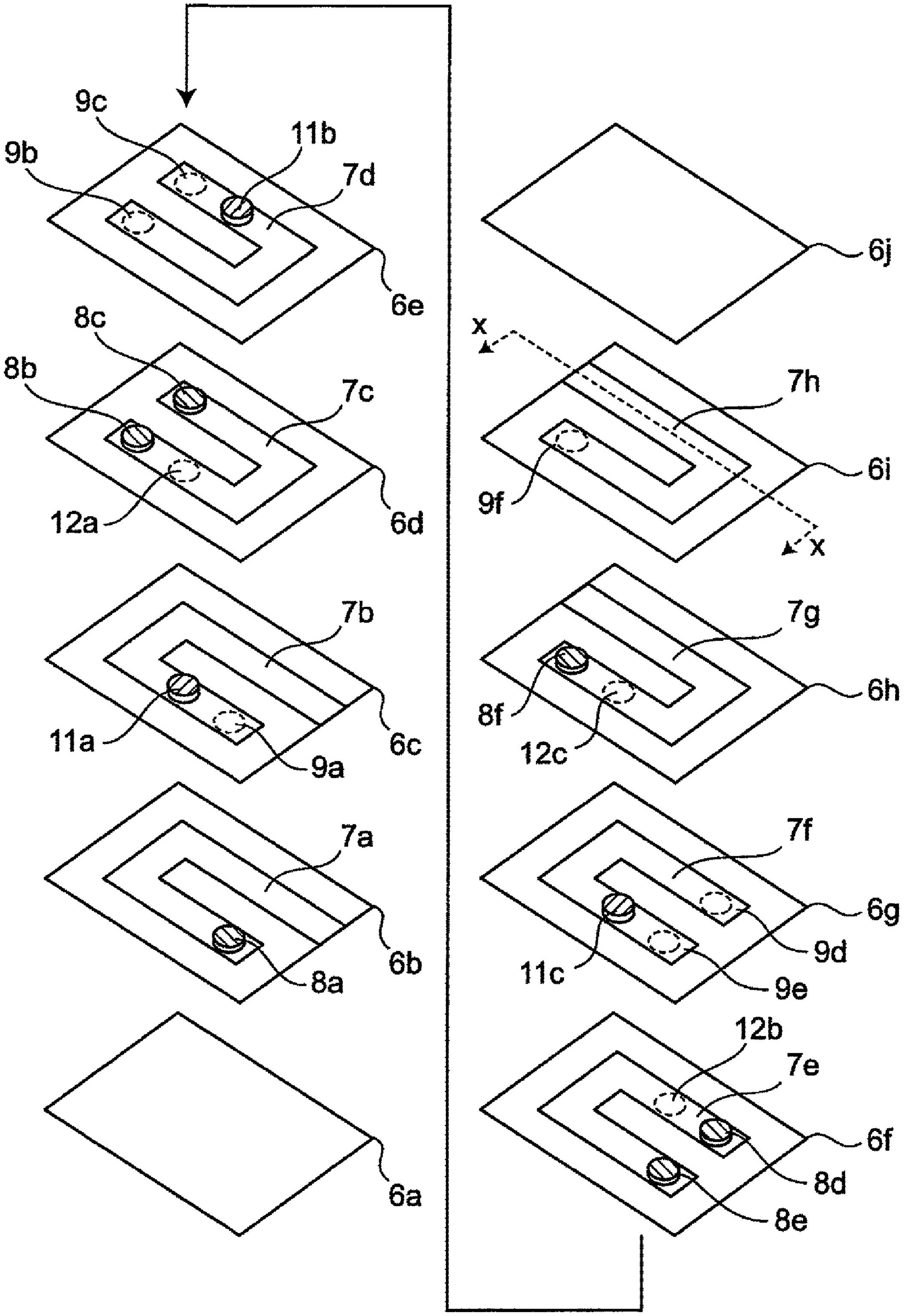
FIG. 2 is an exploded perspective view of the multilayer coil component illustrated in FIG. 1.
Figure 3:
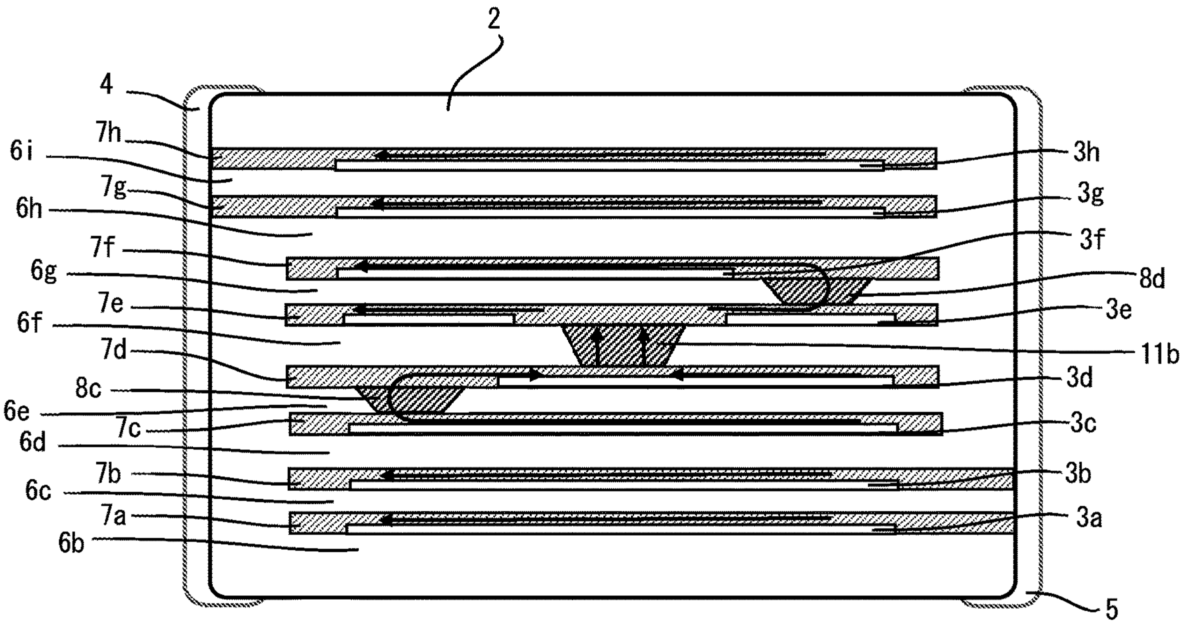
FIG. 3 is a cross-sectional view of the multilayer coil component illustrated in FIG. 1 taken along line x-x and is a diagram illustrating the current flow.

FIG. 1 is a perspective view of a multilayer coil component 1 of this embodiment, and FIG. 2 is an exploded perspective view of an element body of the multilayer coil component 1. FIG. 3 is a cross-sectional view of the multilayer coil component 1 taken along line x-x and schematically shows the electric current flowing therein. However, the shape, arrangement, and other features of the multilayer coil component of this embodiment and respective constituent elements thereof described below are not limited by the examples illustrated in the drawings.

As illustrated in FIGS. 1, 2, and 3, the multilayer coil component 1 of this embodiment has a substantially rectangular parallelepiped shape. In the multilayer coil component 1, surfaces perpendicular to an L axis in FIG. 1 are referred to as "end surfaces", surfaces perpendicular to a W axis are referred to as "side surfaces", and surfaces perpendicular to a T axis are referred to as “upper and lower surfaces”. The multilayer coil component 1 schematically includes an element body 2 and outer electrodes 4 and 5 respectively disposed on two end surfaces of the element body 2. The element body 2 includes a multilayer body in which insulating layers are stacked, and a coil disposed in the multilayer body. As illustrated in FIG. 2, the multilayer body is constituted by insulating layers 6*a* to 6*j* that are stacked on top of each other (hereinafter, these insulating layers may be referred to as “insulating layers 6”). The coil is formed of coil conductors 7*a* to 7*h* (hereinafter, may be referred to as “coil conductors 7”) that are connected through coupling conductors 8*a* to 8*f* (hereinafter, may be referred to as “coupling conductors 8”) and connecting conductors 11*a* to 11*c* (hereinafter, may be referred to as “connecting conductors 11”). Each two adjacent conductors in the stacking direction form one pair and are connected to two coupling conductors, as a result of which a coil conductor group is formed. In other words, the coil conductors 7*a* and 7*b* are electrically connected to each other in parallel through the coupling conductor 8*a* and the one outer electrode 5 so as to constitute a first coil conductor group. The coil conductors 7*c* and 7*d* are electrically connected to each other in parallel through the coupling conductors 8*b* and 8*c* so as to constitute a second coil conductor group. The coil conductors 7*e* and 7*f* are electrically connected to each other in parallel through the coupling conductors 8*d* and 8*e* so as to constitute a third coil conductor group. The coil conductors 7*g* and 7*h* are electrically connected to each other in parallel through the coupling conductor 8*f* and the other outer electrode 4 so as to constitute a fourth coil conductor group. The first coil conductor group and the second coil conductor group are electrically connected to each other in series through the connecting conductor 11*a*. The connecting conductor 11*a* is between the coupling conductor 8*a* and the outer electrode 5 of the first coil conductor group and between the coupling conductors 8*b* and 8*c* of the second coil conductor group, and connects the coil conductor 7*b* to the coil conductor 7*c*. The second coil conductor group and the third coil conductor group are electrically connected to each other in series through the connecting conductor 11*b*. The connecting conductor 11*b* is between the coupling conductors 8*b* and 8*c* of the second coil conductor group and between the coupling conductors 8*d* and 8*e* of the third coil conductor group, and connects the coil conductor 7*d* to the coil conductor 7*e*. The third coil conductor group and the fourth coil conductor group are electrically connected to each other in series through the connecting conductor 11*c*. The connecting conductor 11*c* is between the coupling conductors 8*d* and 8*e* of the third coil conductor group and between the coupling conductor 8*f* and the outer electrode 4 of the fourth coil conductor group, and connects the coil conductor 7*f* to the coil conductor 7*g*. As illustrated in FIG. 3, when the coil conductors are connected as in the aforementioned manner, the electric current flows in parallel in the coil conductor groups; thus, heat generation can be suppressed while reducing the DC resistance of the coil as a whole.

The element body 2 of the multilayer coil component 1 of this embodiment is constituted by a multilayer body including the insulating layers 6 and a coil embedded in the multilayer body.

In the multilayer coil component of the present disclosure, the multilayer body is obtained by stacking multiple insulating layers. However, the number of insulating layers to be stacked in the multilayer coil component of the present disclosure may be any.

The insulating layers 6 are preferably formed of a magnetic body and are more preferably formed of sintered ferrite. The sintered ferrite contains, as main components, at least Fe, Ni, and Zn. The sintered ferrite may further contain Cu.

In one embodiment, the sintered ferrite contains, as main components, at least Fe, Ni, Zn, and Cu.

In the sintered ferrite described above, the Fe content based on $Fe_2O_3$ is preferably about 40.0 mol % or more and about 49.5 mol % or less (i.e., from about 40.0 mol % to about 49.5 mol %) (with reference to the total of main components, the same applies hereinafter), and is more preferably about 45.0 mol % or more and about 49.5 mol % or less (i.e., from about 45.0 mol % to about 49.5 mol %).

In the sintered ferrite described above, the Zn content based on ZnO is preferably about 5.0 mol % or more and about 35.0 mol % or less (i.e., from about 5.0 mol % to about 35.0 mol %) (with reference to the total of main components, the same applies hereinafter), and is more preferably about 10.0 mol % or more and about 30.0 mol % or less (i.e., from about 10.0 mol % to about 30.0 mol %).

In the sintered ferrite described above, the Cu content based on CuO is preferably about 4.0 mol % or more and about 12.0 mol % or less (i.e., from about 4.0 mol % to about 12.0 mol %) (with reference to the total of main components, the same applies hereinafter), and is more preferably about 7.0 mol % or more and about 10.0 mol % or less (i.e., from about 7.0 mol % to about 10.0 mol %).

The Ni content in the sintered ferrite described above is not particularly limited, and may be the balance of the aforementioned other main components, Fe, Zn, and Cu.

In one embodiment, the sintered ferrite contains about 40.0 mol % or more and about 49.5 mol % or less (i.e., from about 40.0 mol % to about 49.5 mol %) of Fe based on $Fe_2O_3$, about 5.0 mol % or more and about 35.0 mol % or less (i.e., from about 5.0 mol % to about 35.0 mol %) of Zn based on ZnO, about 6.0 mol % or more and about 12.0 mol % (i.e., from about 6.0 mol % to about 12.0 mol %) of Cu based on CuO, and about 8.0 mol % or more and about 40.0 mol % or less (i.e., from about 8.0 mol % to about 40.0 mol %) of Ni based on NiO.

In the present disclosure, the sintered ferrite may further contain additive components. Examples of the additive components for the sintered ferrite include, but are not limited to, Mn, Co, Sn, Bi, and Si. The Mn, Co, Sn, Bi, and Si contents (added amounts) respectively based on $Mn_3O_4$, $CO_3O_4$, $SnO_2$, $Bi_2O_3$, and $SiO_2$ with respect to a total of 100 parts by weight of the main components (Fe (based on $Fe_2O_3$), Zn (based on ZnO), Cu (based on CuO), and Ni (based on NiO)) are each preferably about 0.1 parts by weight or more and about 1 part by weight or less (i.e., from about 0.1 parts by weight to about 1 part by weight). The sintered ferrite may further contain impurities that are unavoidable during the production.

The sintered ferrite may further contain, for example, Mn, Co, Sn, Bi, Si, and the like as additive components. Examples of the additive components for the sintered ferrite include, but are not limited to, Mn, Co, Sn, Bi, and Si. The Mn, Co, Sn, Bi, and Si contents (added amounts) respectively based on $Mn_3O_4$, $Co_3O_4$, $SnO_2$, $Bi_2O_3$, and $SiO_2$ with respect to a total of 100 parts by weight of the main components (Fe (based on $Fe_2O_3$), Zn (based on ZnO), Cu (based on CuO), and Ni (based on NiO)) are each preferably about 0.1 parts by weight or more and about 1 part by weight or less (i.e., from about 0.1 parts by weight to about 1 part by weight). The sintered ferrite may further contain impurities that are unavoidable during the production.

The coil of the multilayer coil component of the present disclosure includes at least two coil conductor groups, and each coil conductor group includes at least two coil conductors connected in parallel through two coupling conductors. The coil is formed by connecting these at least two coil conductor groups in series through the connecting conductors.

As illustrated in FIG. 2, the multilayer coil component 1 of this embodiment includes four coil conductor groups. The coil conductors 7*a* and 7*b* are electrically connected to each other in parallel through the coupling conductor 8*a* and the outer electrode 5 so as to constitute a first coil conductor group. Here, the outer electrode 5 is electrically connected to ends of the coil conductors 7*a* and 7*b*, and thus serves as an outer electrode and as a coupling conductor that couples the coil conductor 7*a* with the coil conductor 7*b*. The coil conductors 7*c* and 7*d* are electrically connected to each other in parallel through the coupling conductors 8*b* and 8*c* so as to constitute a second coil conductor group. The coil conductors 7*e* and 7*f* are electrically connected to each other in parallel through the coupling conductors 8*d* and 8*e* so as to constitute a third coil conductor group. The coil conductors 7*g* and 7*h* are electrically connected to each other in parallel through the coupling conductor 8*f* and the other outer electrode 4 so as to constitute a fourth coil conductor group. Here, the outer electrode 4 is electrically connected to ends of the coil conductors 7*g* and 7*h*, and thus serves as an outer electrode and as a coupling conductor that couples the coil conductor 7*g* with the coil conductor 7*h*.

In the multilayer coil component of the present disclosure, the coil conductors included in each of the aforementioned coil conductor groups are arranged to be adjacent to each other in the stacking direction. In each of the coil conductor groups described above, the number of the coil conductors is two or more and five or less (i.e., from two to five) and is preferably two.

In the multilayer coil component of the present disclosure, the coil conductors included in one coil conductor group preferably have the same shape and are at the same position when viewed in plan in the stacking direction.

In the multilayer coil component 1 of the present disclosure, the coil conductors 7*a* and 7*b* are included in the first coil conductor group, the coil conductors 7*c* and 7*d* are included in the second coil conductor group, the coil conductors 7*e* and 7*f* are included in the third coil conductor group, and the coil conductors 7*g* and 7*h* are included in the fourth coil conductor group. The coil conductors included in each coil conductor group have the same shape and are at the same position when viewed in plan in the stacking direction.

The thickness of the coil conductors is preferably about 30 μm or more and about 80 μm or less (i.e., from about 30 μm to about 80 m) and more preferably about 40 m or more and about 70 μm or less (i.e., from about 40 μm to about 70 m). The DC resistance can be decreased when the thickness of the coil conductor is about 30 μm or more. The coil component can be made shorter in height and smaller in size when the thickness of the coil conductor is about 80 μm or less.

The coupling conductors in the multilayer coil component of the present disclosure establish a parallel connection between the coil conductors that are adjacent in the stacking direction. Thus, two coupling conductors are disposed between two coil conductors adjacent in the stacking direction.

The coupling conductors may be any conductors that can establish a parallel connection between the coil conductors that are adjacent in the stacking direction. The coupling conductors are typically disposed inside the multilayer body; however, an outer electrode may be used as coupling conductors. When the coupling conductors are formed inside the multilayer body, the coupling conductors are preferably via conductors disposed in vias that penetrate through the insulating layers.

The cross-sectional area of the coupling conductor is preferably equal to or larger than the cross-sectional area of the coil conductor with which the coupling conductor couples and is more preferably at least 1.5 times as large as the cross-sectional area of the coil conductor. Setting the cross-sectional area of the coupling conductor to be larger than that of the coil conductor can avoid concentration of heat generation in the coupling conductor. Here, the "cross-sectional area" of the coupling conductor refers to the cross-sectional area of the smallest section among sections taken perpendicular to the stacking direction.

In the multilayer coil component 1 of this embodiment, the coupling conductors 8*a* to 8*f* are via conductors that are disposed in vias 9*a* to 9*f* (hereinafter may be referred to as "vias 9") formed in the insulating layers. The outer electrodes 4 and 5 also serve as coupling conductors. To be more specific, the coupling conductor 8*a* is disposed in the via 9*a* and, together with the outer electrode 4, establishes a parallel connection between the coil conductors 7*a* and 7*b*. The coupling conductors 8*b* and 8*c* are respectively disposed in the vias 9*b* and 9*c* and establish a parallel connection between the coil conductors 7*c* and 7*d*. The coupling conductors 8*d* and 8*e* are respectively disposed in the vias 9*d* and 9*e* and establish a parallel connection between the coil conductors 7*e* and 7*f*. The coupling conductor 8*f* is disposed in the via 9*f* and, together with the outer electrode 5, establishes a parallel connection between the coil conductors 7*g* and 7*h*.

The connecting conductors in the multilayer coil component of the present disclosure each establish a series connection between the coil conductor groups that are adjacent in the stacking direction. The connecting conductor is between two coupling conductors of the coil conductor groups connected in series and connects these two coil conductor groups. In other words, the connecting conductor connects the coil conductor disposed between two coupling conductors of one coil conductor group to the coil conductor disposed between two coupling conductors of another coil conductor group. That is, the connecting conductor is connected at a site where a parallel structure of the coil conductor groups is retained. The connecting conductors are preferably via conductors disposed in vias that penetrate through the insulating layers.

In the multilayer coil component 1 of this embodiment, the connecting conductor 11*a* is between the coupling conductor 8*a* and the outer electrode 5 of the first coil conductor group and between the coupling conductors 8*b* and 8*c* of the second coil conductor group, and connects the coil conductor 7*b* to the coil conductor 7*c*; as a result, the connecting conductor 11*a* electrically connects the first coil conductor group to the second coil conductor group in series. The connecting conductor 11*b* is between the coupling conductors 8*b* and 8*c* of the second coil conductor group and between the coupling conductors 8*d* and 8*e* of the third coil conductor group, and connects the coil conductor 7*d* to the coil conductor 7*e*; as a result, the connecting conductor 11*b* electrically connects the second coil conductor group to the third coil conductor group in series. The connecting conductor 11*c* is between the coupling conductors 8*d* and 8*e* of the third coil conductor group and between the coupling conductor 8*f* and the outer electrode 4 of the fourth coil conductor group, and connects the coil conductor 7*f* to the coil conductor 7*g*; as a result, the connecting conductor 11*c* electrically connects the third coil conductor group to the fourth coil conductor group in series. The current can flow in parallel in the coil conductor groups by connecting the coil conductor groups through the connecting conductors as such. In the multilayer coil component 1 of this embodiment, the connecting conductors 11*a* to 11*c* are via conductors that are disposed in vias 12*a* to 12*c* (hereinafter may be referred to as "vias 12") formed in the insulating layers.

Each of the connecting conductors is preferably arranged to be close to one of the coupling conductors so that the coil conductor groups are connected into a coil shape. For example, when a coil conductor is equally divided into ten segments between two coupling conductors (including portions where the coupling conductors are connected), the connecting conductor is connected to a segment closest, second closest, or third closest to one end of the coil conductor, preferably to a segment closest or second closest to the end, and more preferably to a segment closest to the end. In addition, when two connecting conductors are connected to one coil conductor group, one of the connecting conductors is connected at a position close to one end of the coil conductor, and the other connecting conductor is connected at a position close to the other end of the coil conductor. Coil characteristics can be more effectively obtained by placing a connecting conductor in a segment nearer to the end.

The cross-sectional area of the connecting conductors is preferably at least twice as large and more preferably at least three times as large as the cross-sectional area of the coil conductor to which that connecting conductor connects. Setting the cross-sectional area of the connecting conductor to be at least twice as large as that of the coil conductor can avoid concentration of heat generation in the connecting conductor. Here, the "cross-sectional area" of the connecting conductor refers to the cross-sectional area of the smallest section among sections taken perpendicular to the stacking direction.

Each of the connecting conductors in the multilayer coil component of the present disclosure connects coil conductors, which are disposed between two coupling conductors in the coil conductor groups, to each other. In other words, when two coil conductor groups adjacent to each other in the stacking direction and the connecting conductor that connects these coil conductor groups are viewed in plan in the stacking direction, the positional relationship between the coupling conductors and the connecting conductor as viewed along the coil winding direction is as follows: in the coil conductor group on the upper side, the positional order is one (first coupling conductor) of the coupling conductors, the connecting conductor, and the other coupling conductor (second coupling conductor); and in the coil conductor group on the lower side, the positional order is one (first coupling conductor) of the coupling conductors, the connecting conductor, and the other coupling conductor (second coupling conductor). In addition, the connecting conductor is positioned between the second coupling conductor of the coil conductor group on the upper side and the first coupling conductor of the coil conductor group on the lower side. For example, in this embodiment, as illustrated in FIG. 2, when the third coil conductor group that includes the coil conductors 7*e* and 7*f* and the second coil conductor group that includes the coil conductors 7*c* and 7*d* are viewed in plan in the stacking direction, the positional order in the third coil conductor group on the upper side is the first coupling conductor 8*e*, the connecting conductor 11*b*, and the second coupling conductor 8*d*, and the positional order in the second coil conductor group on the lower side is the first coupling conductor 8*c*, the connecting conductor 11*b*, and the second coupling conductor 8*b*. Furthermore, the connecting conductor 11*b* is positioned between the second coupling conductor 8*d* of the third coil conductor group and the first coupling conductor 8*c* of the second coil conductor group.

When the multilayer coil component of the present disclosure is viewed in plan in the stacking direction, one via conductor that serves as a coupling conductor or a connecting conductor is at a position different from the position of a via conductor in an insulating layer adjacent in the stacking direction. In other words, when viewed in plan in the stacking direction, the position of a coupling conductor, which is the via conductor, is shifted from the position of a coupling or connecting conductor in the insulating layer adjacent in the stacking direction. That is, when viewed in plan in the stacking direction, a region where the via conductor is present is completely or partly outside a region where a via conductor in the insulating layer adjacent in the stacking direction is present. By shifting the positions of the via conductors in the insulating layers adjacent to each other in the stacking direction when viewed in plan in the stacking direction, generation of stress caused by the difference between the shrinkage ratio of the via conductors and the shrinkage ratio of the insulating layers during firing, and generation of cracks, etc., can be suppressed.

When the multilayer coil component 1 of this embodiment is viewed in plan in the stacking direction, the via conductor that serves as a coupling conductor or connecting conductor has no overlapping portion with a via conductor in the insulating layer adjacent in the stacking direction. As such, by arranging the via conductors so that via conductors that are in the insulating layers adjacent to each other in the stacking direction have no overlapping portion when viewed in plan in the stacking direction, generation of stress and generation of cracks, etc., can be further suppressed.

In another embodiment, a via conductor that serves as a coupling conductor or a connecting conductor is arranged to have a portion that overlaps a via conductor in the insulating layer adjacent in the stacking direction when viewed in plan in the stacking direction.

Figures 4A, 4B, 4C, 4D, 4E, 4F, 4G, 4H:
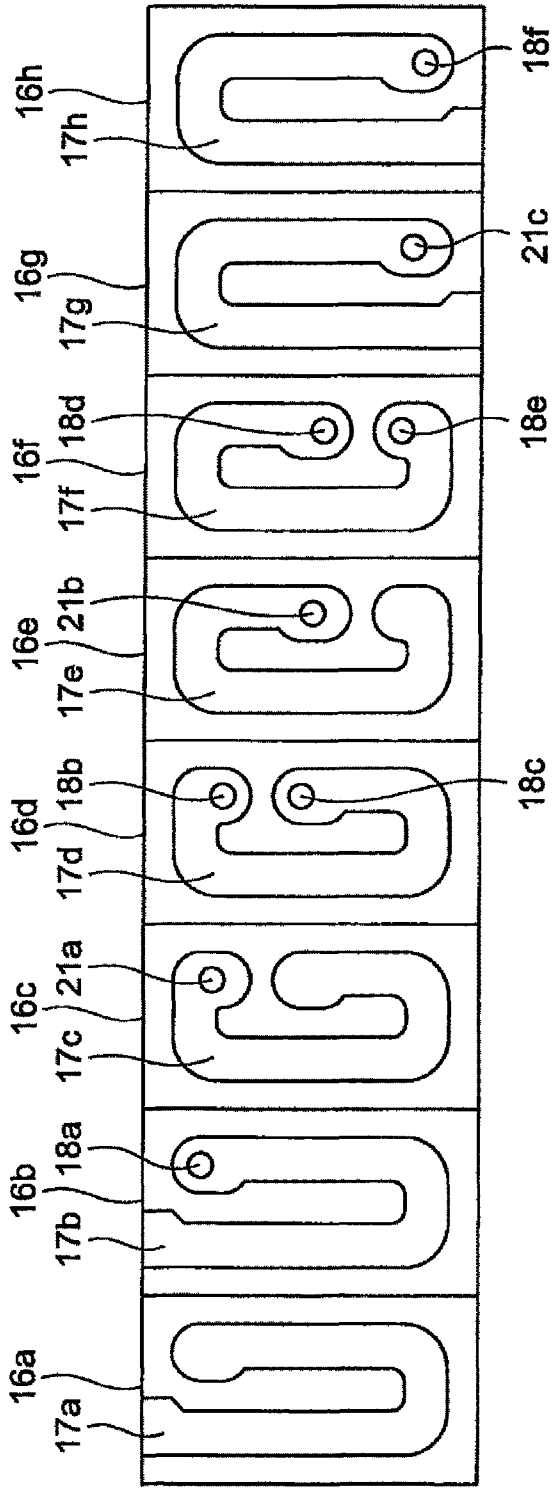
FIGS. 4A to 4H are plan views illustrating a layer structure of a multilayer coil component according to another embodiment.
Figure 5:
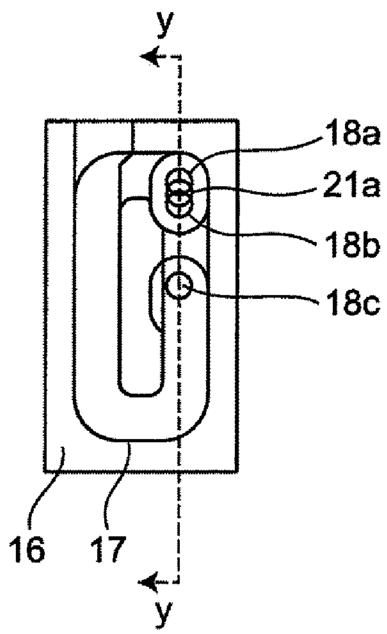
FIG. 5 illustrates a multilayer body constituted by layers illustrated in FIGS. 4A to 4D stacked on top of each other.
Figure 6:
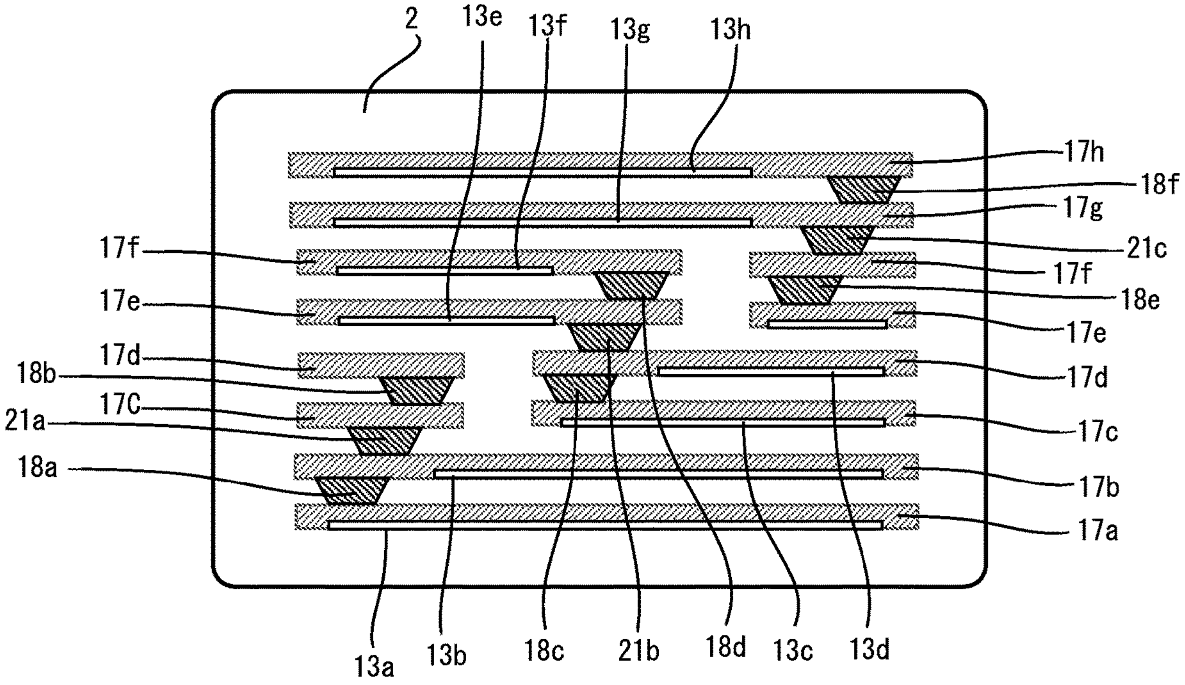
FIG. 6 is a cross-sectional view of the multilayer body illustrated in FIG. 5 taken along line y-y.
Figure 7:
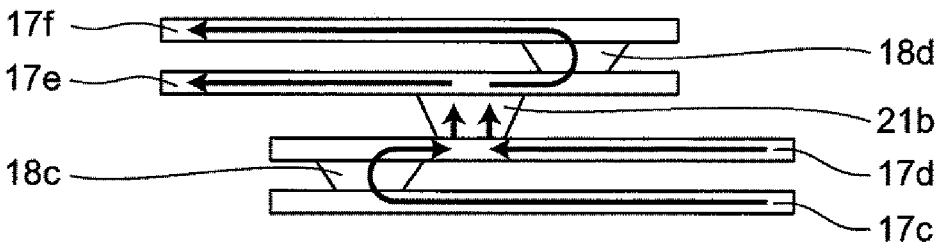
FIG. 7 illustrates the current flow from two layers to another two layers in the cross-sectional view of FIG. 6.
Figure 8:
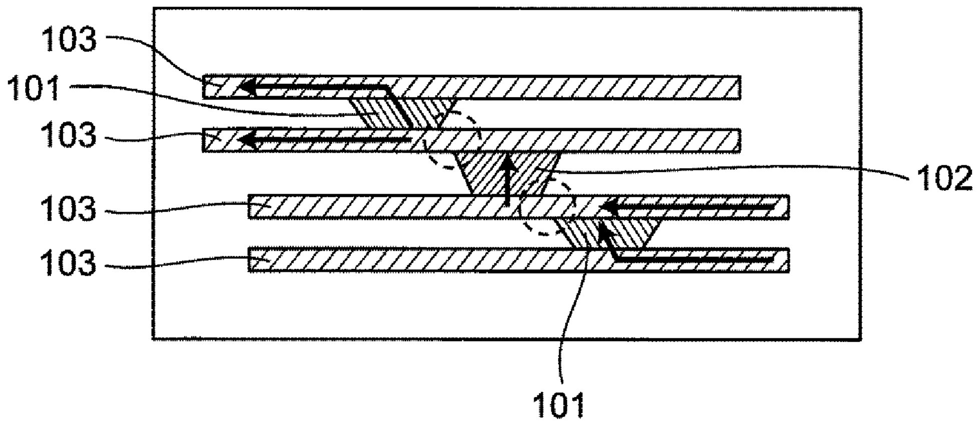
FIG. 8 is a schematic view illustrating the state of connection in a known multilayer coil component.

Such arrangement of vias of this embodiment will now be described with reference to FIGS. 4A to 4H, 5, and 6. FIGS. 4A to 4H respectively illustrate insulating layers 16*a* to 16*h*, and coil conductors 17*a* to 17*h*, coupling conductors 18*a* to 18*f*, and connecting conductors 21*a* to 21*c* that are formed on the insulating layers 16*a* to 16*h*. These layers are stacked in such an order that FIG. 4A illustrates the bottom layer and FIG. 4H illustrates the top layer. FIG. 5 is a diagram illustrating the arrangement of the coil conductors 17*a* to 17*d*, the coupling conductors 18*a* and 18*b*, and the connecting conductor 21*a* when the layers illustrated in FIGS. 4A to 4D are stacked. FIG. 6 is a cross-sectional view of a multilayer body illustrated in FIG. 5 taken at line y-y. FIG. 7 is a diagram illustrating the flow of current in the aforementioned structure. In this embodiment, the coil conductors 17*a* and 17*b* are connected to each other in parallel through the coupling conductor 18*a* and an outer electrode (not illustrated) so as to constitute a first coil conductor group. The coil conductors 17*c* and 17*d* are connected to each other in parallel through the coupling conductors 18*b* and 18*c* so as to constitute a second coil conductor group. The coil conductors 17*e* and 17*f* are connected to each other in parallel through the coupling conductors 18*d* and 18*e* so as to constitute a third coil conductor group. The coil conductors 17_g_ and 17_h_ are connected to each other in parallel through the coupling conductor 18_f_ and an outer electrode (not illustrated) so as to constitute a fourth coil conductor group. The first coil conductor group and the second coil conductor group are connected to each other in series through the connecting conductor 21_a_. The second coil conductor group and the third coil conductor group are connected to each other in series through the connecting conductor 21_b_. The third coil conductor group and the fourth coil conductor group are connected to each other in series through the connecting conductor 21_c_. As illustrated in FIGS. 5 and 6, in this embodiment, the coupling conductor 18_a_, the connecting conductor 21_a_, and the coupling conductor 18_b_ are arranged in this order so as to partially overlap one another. This arrangement prevents current concentration, suppresses temperature elevation, and improves the reliability of the coil.

The percentage of the overlapping portions of the above-described via conductors (coupling conductors and connecting conductor) with respect to the length of the via conductors along the winding direction of the coil conductors is preferably about 2% or more and about 90% or less (i.e., from about 2% to about 90%), about 10% or more and about 70% or less (i.e., from about 10% to about 70%), or about 20% or more and about 60% or less (i.e., from about 20% to about 60%).

The above-described coil conductors, the coupling conductors, and the connecting conductors are conductive layers that contain a conductive material. Preferably, the coil conductors, the coupling conductors, and the connecting conductors are substantially composed of a conductive material. The conductive material is not particularly limited, and examples thereof include Au, Ag, Cu, Pd, and Ni. The conductive material is preferably Ag or Cu, and is more preferably Ag. One conductive material or two or more conductive materials may be used.

In the multilayer coil component of the present disclosure, outer electrodes are disposed on surfaces of the multilayer body and are electrically connected to the coil.

The outer electrodes may each be a single layer or may be multilayered. In one embodiment, each of the outer electrodes is multilayered and is preferably formed of two or more and four or less (i.e., from two to four) layers, for example, three layers.

In the multilayer coil component 1 of this embodiment, the outer electrodes 4 and 5 are disposed to cover the two end surfaces of the element body 2. The outer electrodes are formed of a conductive material and preferably formed of at least one metal material selected from Au, Ag, Pd, Ni, Sn, and Cu.

In one embodiment, the outer electrodes are multilayered and can each include a Ag- or Pd-containing layer, a Ni-containing layer, or a Sn-containing layer. In a preferred embodiment, the outer electrodes each include a Ag- or Pd-containing layer, a Ni-containing layer, and a Sn-containing layer. Preferably, the aforementioned layers are arranged in the order of, from the coil conductor side, a Ag- or Pd-containing layer or preferably a Ag-containing layer, a Ni-containing layer, and a Sn-containing layer. Preferably, the Ag- or Pd-containing layer is a layer obtained by baking a Ag paste or Pd paste, and the Ni-containing layer and the Sn-containing layer can be plating layers.

The multilayer coil component of the present disclosure preferably has a length of about 0.4 mm or more and about 3.2 mm or less (i.e., from about 0.4 mm to about 3.2 mm), a width of about 0.2 mm or more and about 2.5 mm or less (i.e., from about 0.2 mm to about 2.5 mm), and a height of about 0.2 mm or more and about 2.0 mm or less (i.e., from about 0.2 mm to about 2.0 mm), and more preferably has a length of about 0.6 mm or more and about 2.0 mm or less (i.e., from about 0.6 mm to about 2.0 mm), a width of about 0.3 mm or more and about 1.3 mm or less (i.e., from about 0.3 mm to about 1.3 mm), and a height of about 0.3 mm or more and about 1.0 mm or less (i.e., from about 0.3 mm to about 1.0 mm).

In a preferred embodiment, the multilayer coil component of the present disclosure has a void portion formed between the coil conductor and the insulating layer. For example, in the multilayer coil component 1 of this embodiment, void portions 3_a_ to 3_h_ may be respectively formed at the boundaries between the coil conductors 7_a_ to 7_h_ and the insulating layers, for example, insulating layers 6_b_ to 6_i_ (FIG. 2), as shown, for example, in FIG. 3. Similarly, void portions 13_a_ to 13_h_ may be respectively formed at the boundaries between the coil conductors 17_a_ to 17_h_ and the insulating layers, for example, insulating layers 16_b_ to 16_g_ (FIGS. 4A to 4D), as shown, for example, in FIG. 6. Forming a void portion between a coil conductor and an insulating layer can suppress occurrence of stress between the coil conductor and the multilayer body.

The multilayer coil component 1 of the embodiment described above is produced as follows, for example. In this embodiment, an example in which the insulating layers 6 are formed from a ferrite material and a void portion exists between a coil conductor 7 and an insulating layer 6 is described.

(1) Preparation of Ferrite Paste

First, a ferrite material is prepared. The ferrite material contains, as main components, Fe, Zn, and Ni, and, if desired, Cu. Typically, the main components of the ferrite material are practically oxides of Fe, Zn, Ni, and Cu (ideally, $Fe_2O_3$, ZnO, NiO, and CuO).

To prepare the ferrite material, $Fe_2O_3$, ZnO, CuO, NiO, and, if needed, additive components are weighed to obtain a particular composition, and then mixed and pulverized. The pulverized ferrite material is dried and calcined at a temperature of about 700° C. to about 800° C. so as to obtain a calcined powder. To this calcined powder, particular amounts of a solvent (ketone solvent or the like), a resin (polyvinyl acetal or the like), and a plasticizer (alkyd plasticizer or the like) are added, the resulting mixture is kneaded in a planetary mixer or the like, and the kneaded mixture is dispersed with a three-roll mill or the like to prepare a ferrite paste. In addition, to a calcined powder obtained as above, an organic binder such as a polyvinyl butyral binder, and organic solvents such as ethanol and toluene are added, and the resulting mixture is put in a pot mill along with PSZ balls to be mixed and pulverized. The obtained mixture is then formed into sheets having particular thickness, size, and shape by a doctor blade method or the like to prepare ferrite sheets.

The Fe content (based on $Fe_2O_3$), the Mn content (based on $Mn_2O_3$), the Cu content (based on CuO), the Zn content (based on ZnO), and the Ni content (based on NiO) in the sintered ferrite may be considered to be substantially the same as the Fe content (based on $Fe_2O_3$), the Mn content (based on $Mn_2O_3$), the Cu content (based on CuO), the Zn content (based on ZnO), and the Ni content (based on NiO) in the ferrite material before firing.

(2) Preparation of Conductive Paste for Coil Conductor

First, a conductive material is prepared. Examples of the conductive material include Au, Ag, Cu, Pd, and Ni, of which Ag or Cu is preferable and Ag is more preferable. A particular amount of a powder of the conductive material is weighed and kneaded along with particular amounts of a solvent (such as eugenol), a resin (such as ethyl cellulose), and a dispersant in a planetary mixer or the like, and then the resulting mixture is dispersed in a three-roll mill or the like. As a result, a conductive paste for the coil conductor can be prepared.

(3) Preparation of Resin Paste

A resin paste for forming void portions is prepared. The resin paste can be prepared by adding, to a solvent (such as isophorone), a resin (such as an acrylic resin) that disappears when fired.

(4) Preparation of Multilayer Coil Component (4-1) Preparation of Element Body

First, a particular number of ferrite sheets are prepared to serve as a ferrite layer (corresponding to the insulating layer 6*a* in FIG. 2) for an outer layer.

Next, another ferrite sheet (corresponding to the insulating layer 6*b* in FIG. 2) is prepared, and the resin paste is applied by printing to a portion of the ferrite sheet where a void portion is to be formed so as to form a resin paste layer.

Next, the conductive paste is applied by printing to a portion where a coil conductor is to be formed so as to form a conductive paste layer (corresponding to the coil conductor 7*a* in FIG. 2).

Next, the ferrite paste is applied by printing to the region where the conductive paste layer is not formed so that the applied ferrite paste has the same height as the conductive paste layer.

Next, another ferrite sheet (corresponding to the insulating layer 6*c* in FIG. 2) is prepared, a via (corresponding to the via 9*a*) is formed in the ferrite sheet, and the via is filled with the conductive paste (the conductive paste filling the via corresponds to the coupling conductor 8*a* in FIG. 2).

Next, the resin paste is applied by printing to a portion where a void portion is to be formed so as to form a resin paste layer.

Next, the conductive paste is applied by printing to a portion where a coil conductor is to be formed so as to form a conductive paste layer (corresponding to the coil conductor 7*b* in FIG. 2).

Next, the ferrite paste is applied by printing to the region where the conductive paste layer is not formed so that the applied ferrite paste has the same height as the conductive paste layer.

Next, another ferrite sheet (corresponding to the insulating layer 6*d* in FIG. 2) is prepared, a via (corresponding to the via 12*a*) is formed in the ferrite sheet, and the via is filled with the conductive paste (the conductive paste filling the via corresponds to the connecting conductor 11*a* in FIG. 2).

Next, the resin paste is applied by printing to a portion where a void portion is to be formed so as to form a resin paste layer.

Next, the conductive paste is applied by printing to a portion where a coil conductor is to be formed so as to form a conductive paste layer (corresponding to the coil conductor 7*c* in FIG. 2).

These steps are repeated, a particular number of ferrite sheets (corresponding to the insulating layer 6*j* in FIG. 2) were prepared at the final stage, and, as illustrated in FIG. 2, the insulating layers 6*a* to 6*j* are stacked on top of each other. The multilayer body obtained by stacking the sheets are pressure-bonded under heating so as to obtain a multilayer body block, which is an assembly of elements.

Next, this multilayer body block is cut by using a dicer or the like to obtain individual elements.

The obtained element is subjected to a barrel process to round the corners of the element. The barrel process may be performed on a green multilayer body or a fired multilayer body. The barrel process may be a dry process or a wet process. The barrel process may involve scrubbing the elements against each other or performing the barrel process along with media.

After the barrel process, for example, the element is fired at a temperature of about 880° C. or higher and about 920° C. or lower (i.e., from about 880° C. to about 920° C.) to obtain an element body 2 of the multilayer coil component 1. During firing, the resin paste layer disappears, and a void portion is generated in the portion where the resin paste layer used to be. Presence of this void portion can reduce occurrence of stress attributable to shrinkage of the ferrite paste layers and the conductive paste layers during firing.

(4-2) Formation of Outer Electrodes

Next, an outer electrode-forming Ag paste containing Ag and glass is applied to the end surfaces of the element body 2 and baked to form base electrodes. Next, a Ni coating and a Sn coating are sequentially formed on each of the base electrodes by electrolytic plating to form outer electrodes. As a result, a multilayer coil component 1 as illustrated in FIG. 1 is obtained.

One embodiment of the present disclosure has been described heretofore, but the present embodiment is subject to various modifications.

For example, in the description above, ferrite sheets corresponding to the respective insulating layers are prepared, printing is performed on these sheets to form coil patterns, and the element is obtained by pressure-bonding these sheets; alternatively, the element may be obtained by forming all of the layers by printing sequentially.

A multilayer coil component of the present disclosure can be used in a variety of usages including inductors.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

a multilayer body that includes insulating layers that are stacked;

a coil disposed in the multilayer body, the coil including at least two coil conductor groups that each include at least two coil conductors connected to each other in parallel through two coupling conductors, the at least two coil conductor groups being connected to each other in series through a connecting conductor, and the connecting conductor connecting part of the coil conductor between the two coupling conductors in one of the at least two coil conductor groups to part of the coil conductor between the two coupling conductors in another one of the at least two coil conductor groups; and outer electrodes disposed on surfaces of the multilayer body and electrically connected to the coil.

2. The multilayer coil component according to claim 1, wherein the connecting conductor has a cross-sectional area at least twice as large as a cross-sectional area of the one coil conductor to which this connecting conductor connects.

3. The multilayer coil component according to claim 1, wherein a void portion exists between the coil conductor and the insulating layer.

4. The multilayer coil component according to claim 2, wherein a void portion exists between the coil conductor and the insulating layer.

* * * * *